US 6,470,427 B1

(12) United States Patent
Arimilli et al.

(10) Patent No.: US 6,470,427 B1
(45) Date of Patent: Oct. 22, 2002

(54) PROGRAMMABLE AGENT AND METHOD FOR MANAGING PREFETCH QUEUES

(75) Inventors: Ravi Kumar Arimilli, Austin; John Steven Dodson, Pflugerville; James Stephen Fields, Jr.; Guy Lynn Guthrie, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/436,373

(22) Filed: Nov. 9, 1999

(51) Int. Cl.[7] ............................................. G06F 12/00
(52) U.S. Cl. ...................... 711/137; 711/122; 712/207
(58) Field of Search ................................ 711/119, 122, 711/137, 117; 712/207

(56) References Cited

U.S. PATENT DOCUMENTS

| | | |
|---|---|---|
| 4,918,587 A | 4/1990 | Pechter et al. |
| 5,367,656 A | 11/1994 | Ryan |
| 5,588,128 A | 12/1996 | Hicok et al. |
| 5,694,568 A | 12/1997 | Harrison, III et al. |
| 5,790,823 A | 8/1998 | Puzak et al. |
| 5,802,566 A | 9/1998 | Hagersten |
| 5,802,569 A * | 9/1998 | Genduso ..................... 711/137 |
| 5,809,320 A * | 9/1998 | Jain ............................. 395/800 |
| 5,848,432 A * | 12/1998 | Hotta .......................... 711/131 |
| 5,953,512 A | 9/1999 | Cai et al. |
| 6,047,363 A | 4/2000 | Lewchuk |
| 6,138,212 A * | 10/2000 | Chiacchia ................... 711/137 |
| 6,173,392 B1 * | 1/2001 | Shinozaki ................... 712/207 |
| 6,272,619 B1 | 8/2001 | Nguyen et al. |

OTHER PUBLICATIONS

U.S. patent application Ser. No. 09/436,372, Arimilli et al., filed Nov. 9, 1999.
U.S. patent application Ser. No. 09/052,567, Burky et al., filed Mar. 31, 1998.
Kim, Sunil, et al., "Stride–directed Prefetching for Secondary Caches", IEEE, 1997, pp. 314–321.
Fu, John W.C.,et al., "Stride Directed Prefetching in Scalar Processors", IEEE, 1992, pp. 102–110.
Dahlgren, Fredrik, et al., "Effectiveness of Hardware–Based Stride and Sequential Prefetching in Shared–Memory Multiprocessors", IEEE, 1995, pp. 68–77.

* cited by examiner

Primary Examiner—Do Hyun Yoo
Assistant Examiner—Kimberly N. McLean
(74) Attorney, Agent, or Firm—Casimer K. Salys; Bracewell & Patterson, L.L.P.

(57) ABSTRACT

A programmable agent and method for managing prefetch queues provide dynamically configurable handling of priorities in a prefetching subsystem for providing look-ahead memory loads in a computer system. When it's queues are at capacity an agent handling prefetches from memory either ignores new requests, forces the new requests to retry or cancels a pending request in order to perform the new request. The behavior can be adjusted under program control by programming a register, or the control may be coupled to a load pattern analyzer. In addition, the behavior with respect to new requests can be set to different types depending on a phase of a pending request.

20 Claims, 5 Drawing Sheets

PROGRAMMABLE AGENT AND METHOD FOR MANAGING PREFETCH QUEUES

CROSS-REFERENCES TO RELATED APPLICATIONS

The present invention is related to the following application filed concurrently with this application: U.S. patent application Ser. No. 09/436,372 entitled "METHOD AND AGENT FOR MANAGING PREFETCHES ON INTER-CACHE BUSES".

The present invention also relates to U.S. patent application Ser. No. 09/052,567 entitled "PROCESSOR AND METHOD OF PREFETCHING DATA BASED UPON A DETECTED STRIDE" filed Mar. 31, 1998 and assigned to the same assignee. The specification is incorporated herein by reference.

BACKGROUND OF THE INVENTION

1. Field of the Invention

The present invention generally relates to computer systems, and more specifically to an agent and method for managing queued prefetch requests between two levels of a memory hierarchy in a computer system. In particular, the present invention makes more efficient use of a cache hierarchy by providing a separate agent to perform prefetch requests.

2. Description of Related Art

The basic structure of a conventional computer system includes one or more processing units connected to various input/output devices for the user interface (such as a display monitor, keyboard and graphical pointing device), a permanent memory device (such as a hard disk, or a floppy diskette) for storing the computer's operating system and user programs, and a temporary memory device (such as random access memory or RAM) that is used by the processor(s) in carrying out program instructions. The evolution of computer processor architectures has transitioned from the now widely-accepted reduced instruction set computing (RISC) configurations, to so-called superscalar computer architectures, wherein multiple and concurrently operable execution units within the processor are integrated through a plurality of registers and control mechanisms.

The objective of superscalar architecture is to employ parallelism to maximize or substantially increase the number of program instructions (or "micro-operations") simultaneously processed by the multiple execution units during each interval of time (processor cycle), while ensuring that the order of instruction execution as defined by the programmer is reflected in the output. For example, the control mechanism must manage dependencies among the data being concurrently processed by the multiple execution units, and the control mechanism must ensure the integrity of data that may be operated on by multiple processes on multiple processors and potentially contained in multiple cache units. It is desirable to satisfy these objectives consistent with the further commercial objectives of increasing processing throughput, minimizing electronic device area and reducing complexity.

Both multiprocessor and uniprocessor systems usually use multi-level cache memories where typically each higher level is smaller and has a shorter access time. The cache accessed by the processor, and typically contained within the processor component of present systems, is typically the smallest cache.

Both data and instructions are cached, and data and instruction cache entries are typically loaded before they are needed by operation of prefetch units and branch prediction units. Groups of instructions, called "streams", associated with predicted execution paths can be detected and loaded into cache memory before their actual execution. Likewise data patterns can be predicted by stride detection circuitry and loaded before operations requiring the data are executed.

Although branch prediction and stride analysis can provide fairly complete availability within the cache connected to a processor, cache faults can still occur, when a value required by a processor has not been preloaded into the highest level of cache. These requests are always labeled demand requests, as they are needed by a processor. In addition, requests for values that will be needed by a processor are generated as demand requests, even though the requests are not for values immediately required by a processor.

If prefetch requests are attached to demand requests to load values that are predicted to be needed, these requests compete with the demand requests going to a cache controller. In addition, cache controller complexity is increased if the predictions are made within the cache itself or the cache has to distinguish between prefetch requests and demand requests. The treatment of large quantities of predicted prefetch requests can also overload the capabilities of the cache, and depending on the type of application being executed, ideal handling of prefetch requests and overloading will vary.

In light of the foregoing, it would be desirable to provide a method of improving prefetch handling by computer systems which will speed up core processing. It would be further advantageous if the method and apparatus allowed dynamic adjustment of prefetch request handling.

SUMMARY OF THE INVENTION

It is therefore one object of the present invention to provide an improved processor for a computer system, having a prefetch unit.

It is another object of the present invention to provide a computer system using such a processor, which also has a prefetch unit.

It is yet another object of the present invention to provide a computer system and processor that provide more efficient loading of prefetches.

The foregoing objects are achieved in a method and apparatus for loading prefetch values into a memory subsystem having associated prefetch queues, wherein when at least one of said prefetch queues are busy, a response to a demand request is selected based upon a programmed value. The programmed response may be one of: ignoring the new demand request, causing the demand request to retry, or flushing a pending prefetch entry and replacing it with an entry associated with the demand request. The response may vary with a phase of the bus transaction, allowing for a programmed ignore, flush or retry response selection for each of three phases delineated by: the receipt of a response to a prior demand request, the receipt of a response to a set of prefetches associated with a prior demand request, and a phase in which prefetches associated with a prior demand request are being retried.

The above as well as additional objectives, features, and advantages of the present invention will become apparent in the following detailed written description.

DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 1:
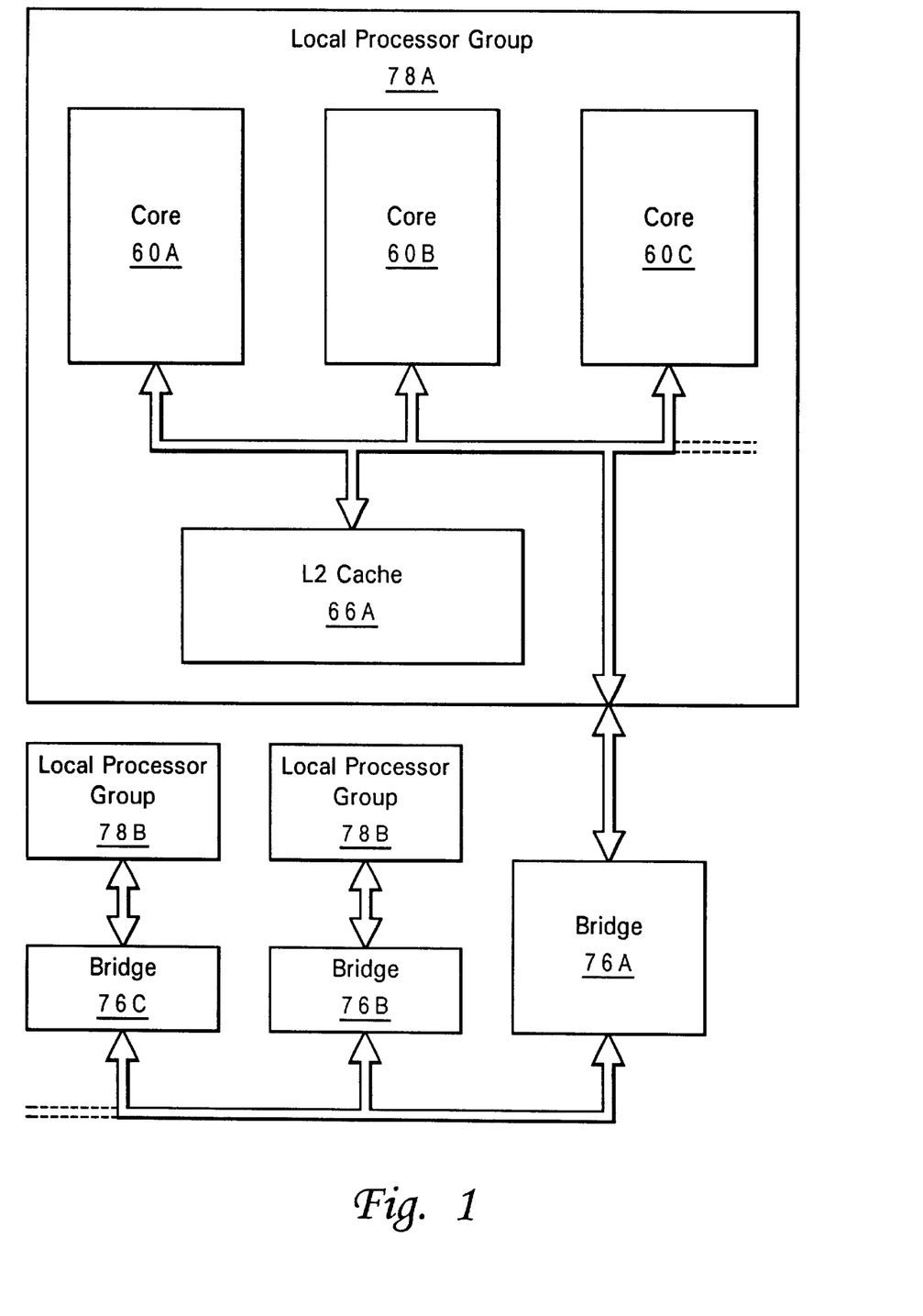
FIG. 1 is an electrical block diagram of a multiprocessor computing system in which the present invention may be practiced, depicting core execution units, system memory, buses and bus bridges.

With reference now to the figures, and in particular with reference to FIG. 1, a multiprocessor computing system is shown in which the present invention can be practiced. The computing system is a connection of local processor groups 78 that perform program operations. This arrangement is particularly useful for scalar mathematical operations such as array multiplication and inversion. Local processor groups comprise cores 60 that may contain caches or other local storage and the processor groups share a level of cache or memory, specifically L2 cache 66A in this example, that can be accessed by all of the processors in a group, and optionally by other local processing groups through bridges 76.

Figure 2:
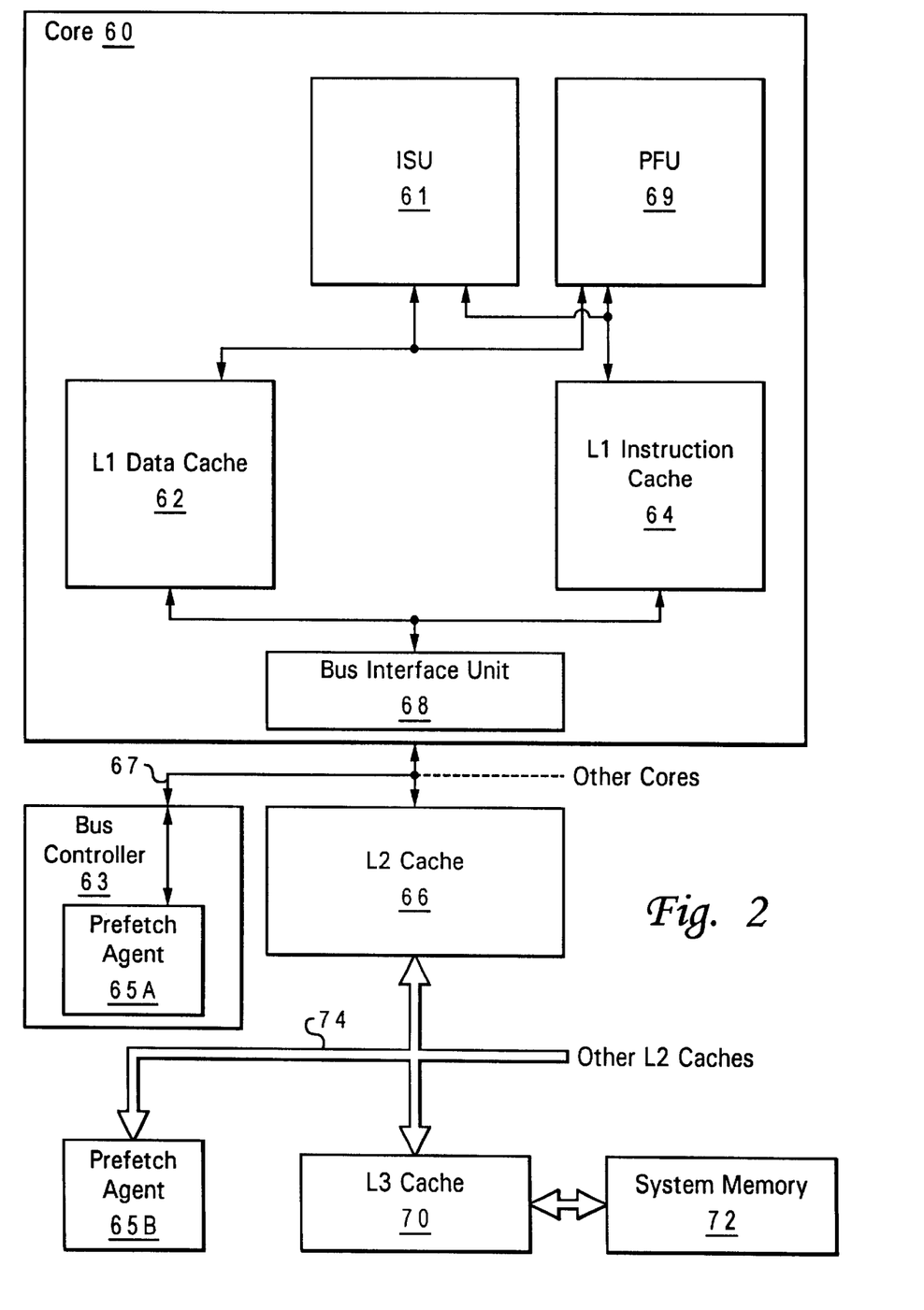
FIG. 2 is an electrical block diagram of a processor containing a prefetch agent in accordance with the present invention connecting to a local bus with a second prefetch agent in accordance with the present invention.

Referring now to FIG. 2, a processor core in which the present invention is embodied 60 is shown. Instruction sequencer unit (ISU) 61 and prefetch unit (PFU) 69 are coupled to two caches. L1 data cache 62 is used to store operand data, that is, values that are operated on by processor instructions. L1 instruction cache 64 is used to store instructions to be executed by ISU 61. L1 caches 62 and 64 are coupled to bus 67 by bus interface unit 68. Requests for operand data or instructions by ISU 61 or PFU 69 cause read requests to L1 caches 62 and 64. If a value at the particular requested address is not present in L1 cache 62 or 64 (depending on whether an instruction or operand data is being loaded), a read request will be issued through bus interface unit 68 to L2 cache 66. Likewise if the value at the read address is not present in L2 cache 66, a read request is generated on lower level bus 74 to L3 cache 70. The process continues down however many levels are present in the memory hierarchy, including page file operations from disk storage units.

Techniques have been developed whereby values that are either required by ISU 61 or predicted by prefetch unit 69, can be loaded with a demand request with hint information attached. This hint information allows the loading of other values that are organized in a pattern described by the hint information. The information used in this illustrative embodiment is a stride factor and a block count, but this invention should be understood to encompass other information that would produce a useful pattern of preloads from a cache or data storage means, such as reference count information that might be used to set priorities when multiple requests are pending.

After the response to a demand request has been received on the bus, a series of prefetch requests can be created based on the hint information. By taking the address of the demand request, adding the stride factor to compute a next address, decrementing the block count and repeating this until the block count is zero, the hint information can be used directly to produce a desired pattern of prefetches. If the prefetches are performed by the cache itself, the complexity of the cache controller is increased. Also, if a large amount of prefetch requests are queued for read accesses and there is no management of priority for demand requests, there can be a detrimental effect on system performance.

The bus transaction type identifier is distinct between a demand read request versus and a prefetch read request. The lower level cache controller senses this distinction and stores the results of the prefetch requests in its data area. Thus, the higher level in the memory hierarchy receives the results of the demand request, but the lower level stores the associated prefetch values in anticipation of those values being needed by the upper level.

The present invention includes a prefetch agent 65A, separate from the cache and colocated with, i.e., contained within or coupled to, the bus arbitor, such as bus controller 63 in the illustrated embodiment. This prefetch agent snoops bus 67 to which it is connected, and creates prefetch reads after the demand read response has been received from L2 Cache 66. Close coupling to bus controller 63, allows prefetch agent 65A to generate a series of requests after the receipt of a response to the associated demand request. Since bus controller 63 controls arbitration for the bus, it can complete the prefetch requests without requiring an additional arbitration cycle. This structure not only applies to the connection between L1 caches 62, 64 and L2 cache 66 via bus interface unit 68 and the connection between L2 cache 66 and L3 cache 70 on bus 74, but can be applied at any level in the memory hierarchy. Prefetch agent 65B may be integrated in the bus control logic for bus 74 with the same benefits of being able to complete prefetch requests without additional arbitration cycles.

Figure 3:
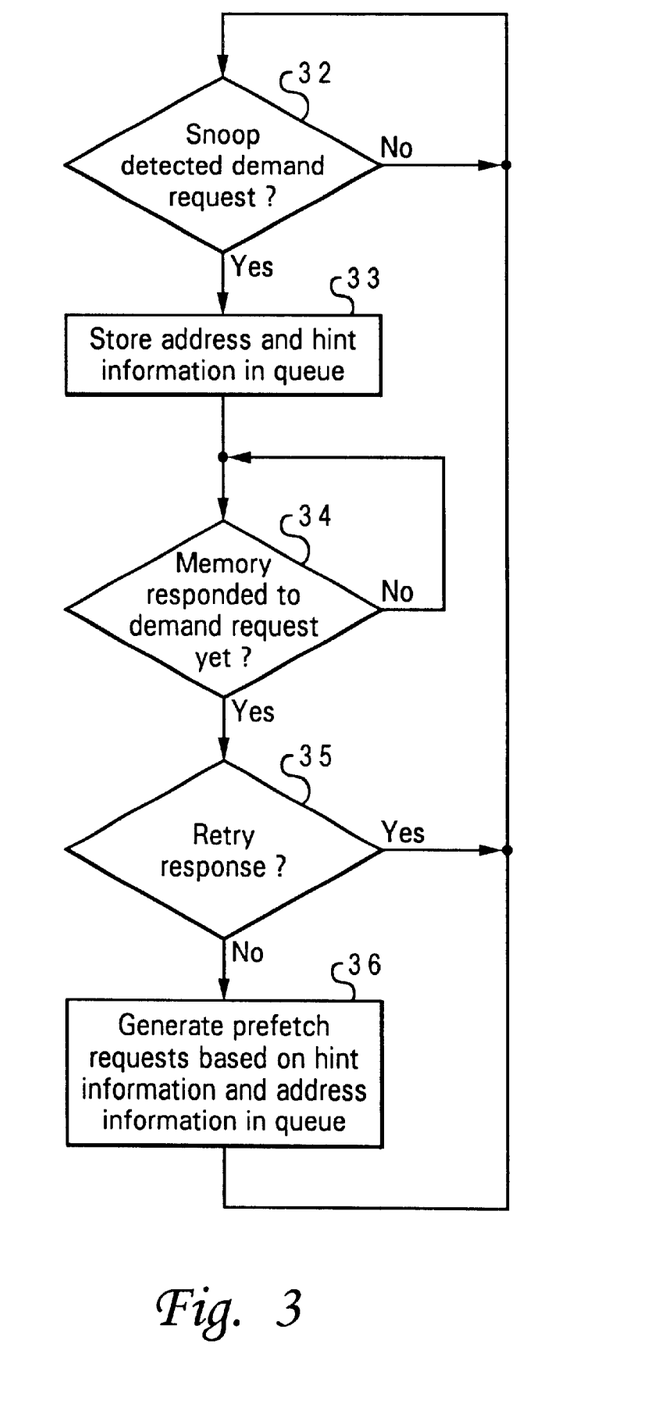
FIG. 3 is a flow diagram of one embodiment of a method of the present invention.

Referring additionally to FIG. 3, a method in accordance with the illustrative embodiment is shown. For this illustration memory requests on bus 74 will be used as examples. Memory read requests on bus 67 (or other bus incorporating a prefetch agent of the present invention) will generally follow this method. Prefetch agent 65B snoops bus 74 and does not act until a demand read request is detected (decision 32). When a demand read request is detected, the address and hint information associated with the request are stored in a queue in prefetch agent 65 (step 33). The hint information may include stride factors and block counts as described above. Prefetch agent 65 continues to snoop local bus 74, and when the lower level cache or memory gives a response to the demand read request (decision 34) if the response is not a retry (decision 35), then prefetch agent 65 generates one or more prefetch requests based on the hint information (step 36). Prefetch agent 65 will usually contain more than one queue, and the method of FIG. 3 can be performed concurrently and independently for each queue. The results of the prefetch request are stored in L2 cache 66, while the result of the demand request is received by L1 data cache 62 if the demand request was for operand data or L1 instruction cache 64 if the demand request was for one or more instructions.

Figure 4:
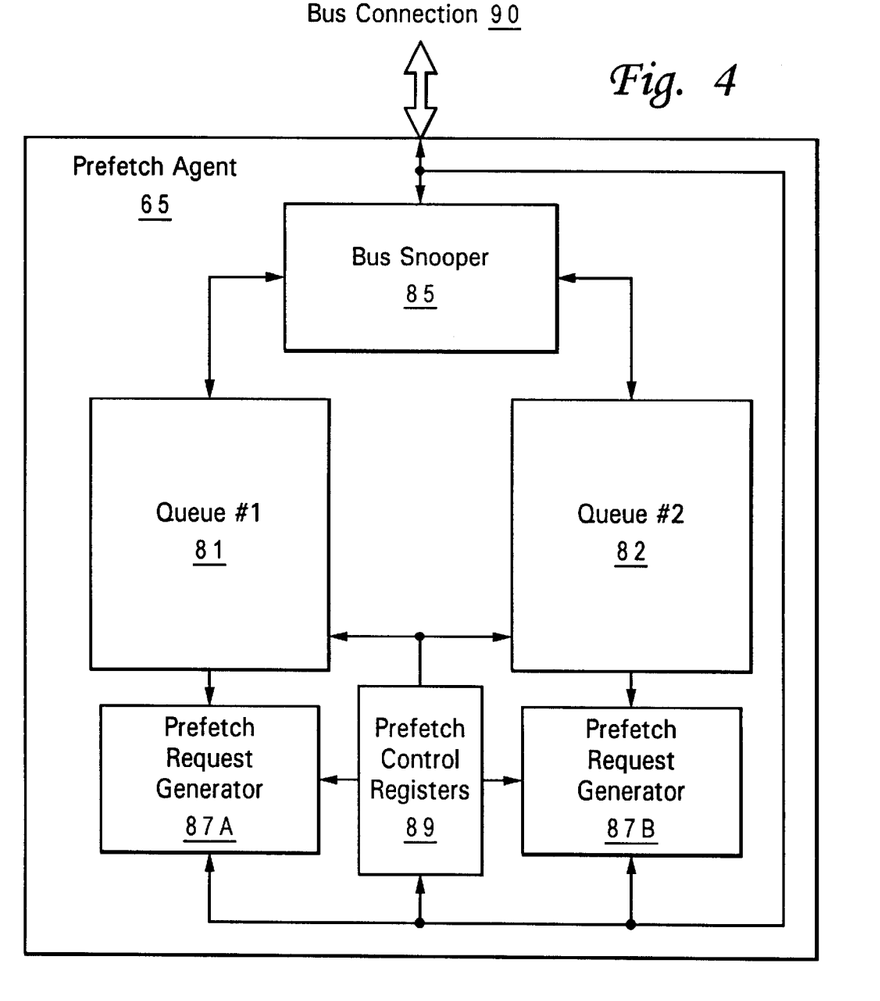
FIG. 4 is an electrical block diagram of a prefetch agent in accordance with the present invention.

Referring now to FIG. 4 the structure of prefetch agent 65 is shown. Prefetch agent 65 connects to a bus at bus connection 90. Bus snooper 85 detects demand memory transactions on the bus and also the state of the responses to demand and prefetch requests. Prefetch Agent 65 includes two queues 81 and 82, in which hint information associated with demand requests can be stored. Prefetch request generator 87A is coupled to queue 81, and is further coupled to bus connection 90. If bus snooper 85 detects a demand request, the address and hint information can be stored in one of queue 81 or 82. Then when bus snooper 85 detects a non-retry response to the demand request, prefetch request generator 87A or 87B can generate a set of prefetches through bus connection 90. If a retry response is detected, the agent does not generate prefetch requests for this demand request, and is free to process the next request. Prefetch request generators 87A and 87B could also be provided by a single logic unit shared by queues 81 and 82. This embodiment of prefetch agent 65 is exemplary and a prefetch agent in accordance with the present invention may contain one or more queues of any depth. One of the advantages of the present invention is that this agent may be scaled without any increased complexity in the cache with which it is used, and the number of queues and the depth of the queues can be tailored to optimize performance at different levels of the memory hierarchy.

Prefetch control registers 89 optionally provide a further improvement to the method of the present invention. By adding programmability, i.e., prefetch overflow control, to the behavior of prefetch request generators 87A and 87B, a method of handling queue overflow conditions that occur when queues 81 and 82 are busy, i.e., full. The registers can be programmed by software or microcode operations or logic that is hardwired to implement the prefetch overflow control. The user that programs the registers uses information about program execution and data loads to dynamically adjust the behavior of the queues to optimize processing system performance. When a demand request occurs at bus connection 90 and both queues 81 and 82 are loaded with prefetch hint information for prior demand requests, prefetch agent 65 can ignore the new demand request, generating no prefetches in association with it. Alternatively prefetch agent 65 may flush a prefetch request set that is queued in one of queues 81 and 82 and store the hint information for the new demand request in the flushed queue. Lastly, prefetch agent 65 may cause a retry response to be issued for the demand request.

Figure 5:
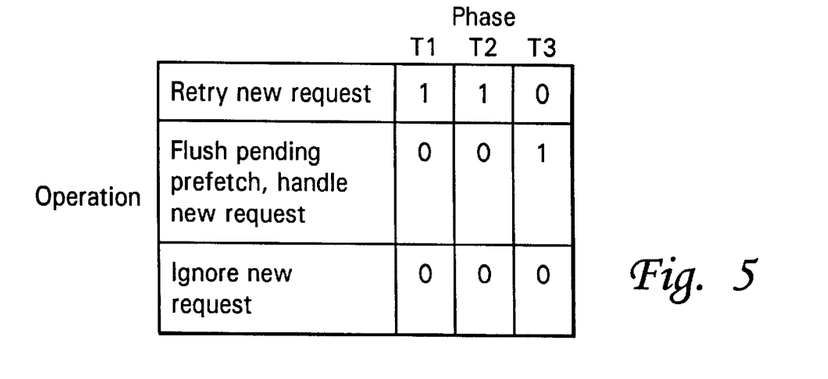
FIG. 5 is a table showing control bit functions for a prefetch unit in accordance with one embodiment of the present invention.

Prefetch control registers 89 also may comprise a set of selectors for ignore, retry or flush operations for each phase of the handling of a prior demand request that is in progress, an illustrative embodiment is depicted in FIG. 5. Generally, if at least one queue 81 or 82 is not busy and a prefetch or demand operation is in progress associated with a prior demand request, then prefetch information associated with the new demand request will be placed in the empty queue. If both queues are full, and the demand or prefetch request is being completed for one queue, bus snooper 85 can determine the state of bus connection 90 and prefetch agent 65 can select an operation depending on the progress of the prefetch request in the queue which the bus is currently servicing.

Referring to FIG. 5, a table shows a selection of operations based on the phase of a request being currently serviced. The rows of the table correspond to different, mutually exclusive operations of retry, flush or ignore and the columns correspond to the three phases for which the operations are programmable. One and only one row value should be selected for a given column to select an operation for a given phase of the prior queued request. This table is by way of example only, and the per-phase behavior of prefetch agent 65 may be by any means that provides a programmable or logic based control, such as decodable bit fields within a register. The controls may also come from hardware units that are determining execution trends of the computer system and make adjustments based on system performance and application.

In this exemplary implementation, the three phases used by prefetch agent 65 to select a treatment of queue busy conditions begin with an initial phase in which the memory or cache has not responded to the demand portion of the prior request. This first phase is labeled T1. The next phase T2 is from the time that the response (other than a retry response) to the demand portion of the prior request has been received, the prefetch portion of the request has therefore begun and a response to the prefetch portion of the request has not been received. The last phase T3 only occurs when a retry response is received for the prefetch portion of the request (the portion generated by prefetch request generators 87A and 87B in the illustrative embodiment) and lasts until a complete non-retry response is received for the entire request.

The operations selected in FIG. 5 will cause prefetch agent 65 to issue a retry response to any demand requests generated while both queue 81 and 83 are busy, unless the prefetch portion of the request is being retried which is state T3. This is an example of the type of behavior that might be selected at a given time in the computer system. Other behaviors may be selected based on cache use profiling, stride pattern detection or other measurements that indicate processor and memory performance.

Figure 6:
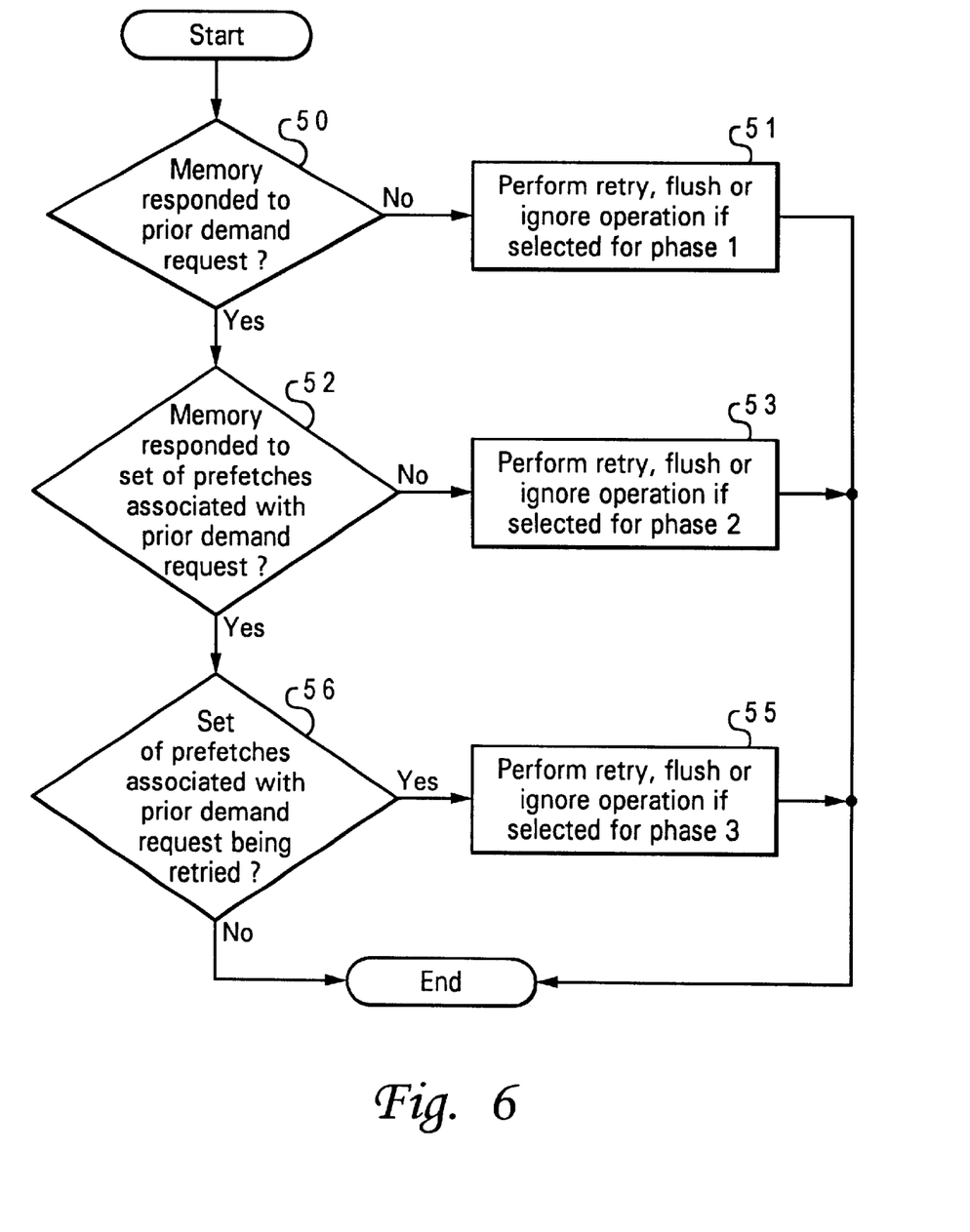
FIG. 6 is a flow diagram of another embodiment of a method of the present invention.

Referring now to FIG. 6, the behavior of prefetch agent 65 under certain queue overload conditions is shown. The conditions control the prefetch agent's response to additional demand requests while a prior request is in any of the three phases described above. If memory has not responded to the prior demand request (decision 50), the selected operation for phase 1 is performed 51. If a non-retry response to the demand request has been received and if the response to the prefetch portion has not yet been received (decision 52), then the operation selected for phase 2 is performed (step 53). If responses have been received for both portions of the request, but the response received for the prefetch portion of the request is a retry (decision 56) then the operation for phase 3 is performed (step 55).

While the above techniques apply to computer systems with cache memories, and specifically, to a super-scalar processor system with cache memories, they are adaptable and contemplated to be useful in conjunction with other memory structures and other storage devices within a computer system. For example, the method might be used for queuing read-ahead accesses to direct access storage devices, as well as the cache of the illustrative embodiment. The upper level storage subsystem would be the storage subsystem closer in access to the processor, which in the illustrative embodiment includes the instruction and data caches.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of operating a computer system, having at least one memory subsystem, comprising the steps of:

selecting an action for a prefetch overflow control having multiple selectable actions including a retry selector to define a desired action to be taken when one or more new demand requests are detected at a time that all available prefetch queues associated with said memory subsystem are busy responsive to previous demand requests;

receiving a new demand request for a value in said memory subsystem;

responsive to said new demand request, determining that all available prefetch queues. associated with said memory subsystem are busy responsive to previous demand requests; and reacting to said new demand request in conformance with said selected action in said prefetch overflow control including, responsive to said determining step, issuing a retry in response to said demand request when said retry selector is in a selected state.

2. The method of claim 1, wherein said prefetch overflow control further includes a flush selector, said flush selector is in a selected state, and further comprising the steps of:

in response to said determining step, cancelling an entry associated with a previous request from a prefetch queue; and response to said determining step, entering a new entry in said prefetch queue for generating prefetch loads in association with said demand request.

3. The method of claim 1, wherein said prefetch overflow control further includes an ignore selector, said ignore selector is in a selected state, and further comprising the step of ignoring said demand request in response to said determining step.

4. The method of claim 1, wherein said prefetch overflow control further includes at least one phase selector indicating an action to take if a response to a prior demand request has not been received, and said reacting step operates said memory subsystem in conformance with said phase selector.

5. The method of claim 1, wherein said prefetch overflow control further includes at least one phase selector indicating an action to take if a response to a set of prefetch requests associated with a prior demand request has not been received, and said reacting step operates said memory subsystem in conformance with said phase selector.

6. The method of claim 1, wherein said prefetch overflow control further includes at least one phase selector indicating an action to take if at least one prefetch request associated with a prior demand request is being retired, and said reacting step operates said memory subsystem in conformance with said phase selector.

7. The method of claim 1, wherein said prefetch overflow control further includes an ignore selector and a flush selector, only one of which can be in a selected state and said reacting step operates said memory subsystem in conformance with a selected state of said retry selector, said ignore selector and said flush selector.

8. The method of claim 1, further comprising the step of programing a register with said prefetch overflow control.

9. A method of operating a computer system, having at least one memory subsystem, comprising the steps of:

selecting an action for a prefetch overflow control having multiple selectable actions to define a desired action to be taken when one or more new demand requests are detected at a time that all available prefetch queues associated with said memory subsystem are busy responsive to previous demand requests;

receiving a new demand request for a value in said memory subsystem;

responsive to said new demand request, determining that all available prefetch queues associated with said memory subsystem are busy responsive to previous demand requests; and reacting to said new demand request in conformance with said selected action in said prefetch overflow control, wherein said prefetch overflow control includes at least one phase selector indicating an action to take if a response to a prior demand request has not been received, at least one other phase selector indicating an action to take if a response to a set of prefetch requests associated with a prior demand request has not been received, at least one yet another phase selector indicating an action to take if at least one prefetch request associated with a prior demand request is being retired, and said reacting step operates said memory subsystem in conformance with a present phase of said memory subsystem and the action indicated by said prefetch overflow control for said present phase.

10. The method of claim 9, wherein said at least one phase selector, said other phase selector and said yet another phase selector each include a retry selector, an ignore selector and a flush selector, for indicating said action, only one of which can be in a selected state within a given phase selector, and said reacting step operates said memory subsystem in conformance with a present phase of said memory subsystem and the action indicated by said prefetch overflow control for said present phase.

11. A computer system comprising:

processor means for executing a set of program instructions;

at least one multi-level memory subsystem for storing values used by said processor means;

at least one bus for coupling one level of said at least one memory subsystem to another level of said memory subsystem; and a prefetch agent including at least one prefetch queue, coupled to said bus for preloading values in association with demand requests to said other level of said memory subsystem; and prefetch overflow control having multiple selectable actions including a retry selector, coupled to said prefetch agent, for selecting an action to be performed in response to said demand requests when said at least one prefetch queue is busy, wherein said prefetch overflow control issues retry responses to said demand requests when said at least one prefetch queue is busy and said retry selector is selected.

12. The computer system of claim 11, wherein said prefetch overflow control flushes said at least one prefetch queue and enters new entries in said prefetch queue in response to each of said demand requests when said at least one prefetch queue is busy and a flush selector is selected.

13. The computer system of claim 11, said prefetch overflow control further includes an ignore selector, and said prefetch overflow control ignores said demand requests when said at least one prefetch queue is busy if said ignore selector is selected.

14. The computer system of claim 11, wherein said prefetch overflow control further includes at least one phase selector for selecting said action if a response to a prior demand request has not been received.

15. The computer system of claim 11, wherein said prefetch overflow control further includes at least one phase selector for selecting said action if a response to set of prefetch requests associated with a prior demand request has not been received.

16. The computer system of claim 11, wherein said prefetch overflow control further includes at least one phase selector for selecting said action if at least one prefetch request associated with a prior demand request is being retried.

17. The computer system of claim 11, wherein said prefetch overflow control further includes an ignore selector, and a flush selector, only one of which can be in a selected state and said prefetch overflow control selects said action based on a selected state of said retry selector, said ignore selector and said flush selector.

18. The computer system of claim 11, wherein said prefetch overflow control includes a programmable register and said prefetch overflow control selects said action based on the contents of said programmable register.

19. A computer system comprising:
  processor means for executing a set of program instructions;
  at least one multi-level memory subsystem for storing values used by said processor means;
  at least one bus for coupling one level of said at least one memory subsystem to another level of said memory subsystem; and
  a prefetch agent including at least one prefetch queue, coupled to said bus for preloading values in association with demand requests to said other level of said memory subsystem; and
  prefetch overflow control having multiple selectable actions coupled to said prefetch agent, for selecting an action to be performed in response to said demand requests when said at least one prefetch queue is busy, wherein said prefetch overflow control includes at least one phase selector for selecting said action if a response to a prior demand request has not been received, at least one other phase selector for selecting said action if a response to set of prefetch requests associated with a prior demand request has not been received, and at least one yet another phase selector for selecting said action if at least one prefetch request associated with a prior demand request is being retried, and said prefetch overflow control selects said action based on a present phase of said memory subsystem, said selection determined by one of said first phase selector, said second phase selector and said third phase selector.

20. The computer system of claim 19, wherein said at least one phase selector, said a other phase selector and said yet another phase selector each include a retry selector, an ignore selector and a flush selector, only one of which can be in a selected state within a given phase selector, and said prefetch overflow control selects said action based a retry selector and ignore selector and a flush selector within one of said at least one phase selector, said other phase selector and said yet another phase selector determined by a present phase of said memory subsystem.

\* \* \* \* \*